Feb. 10, 1942.  W. G. HARDING  2,272,704
METHOD AND APPARATUS FOR MAKING CORRUGATED TUBES
Filed May 29, 1940   2 Sheets-Sheet 1
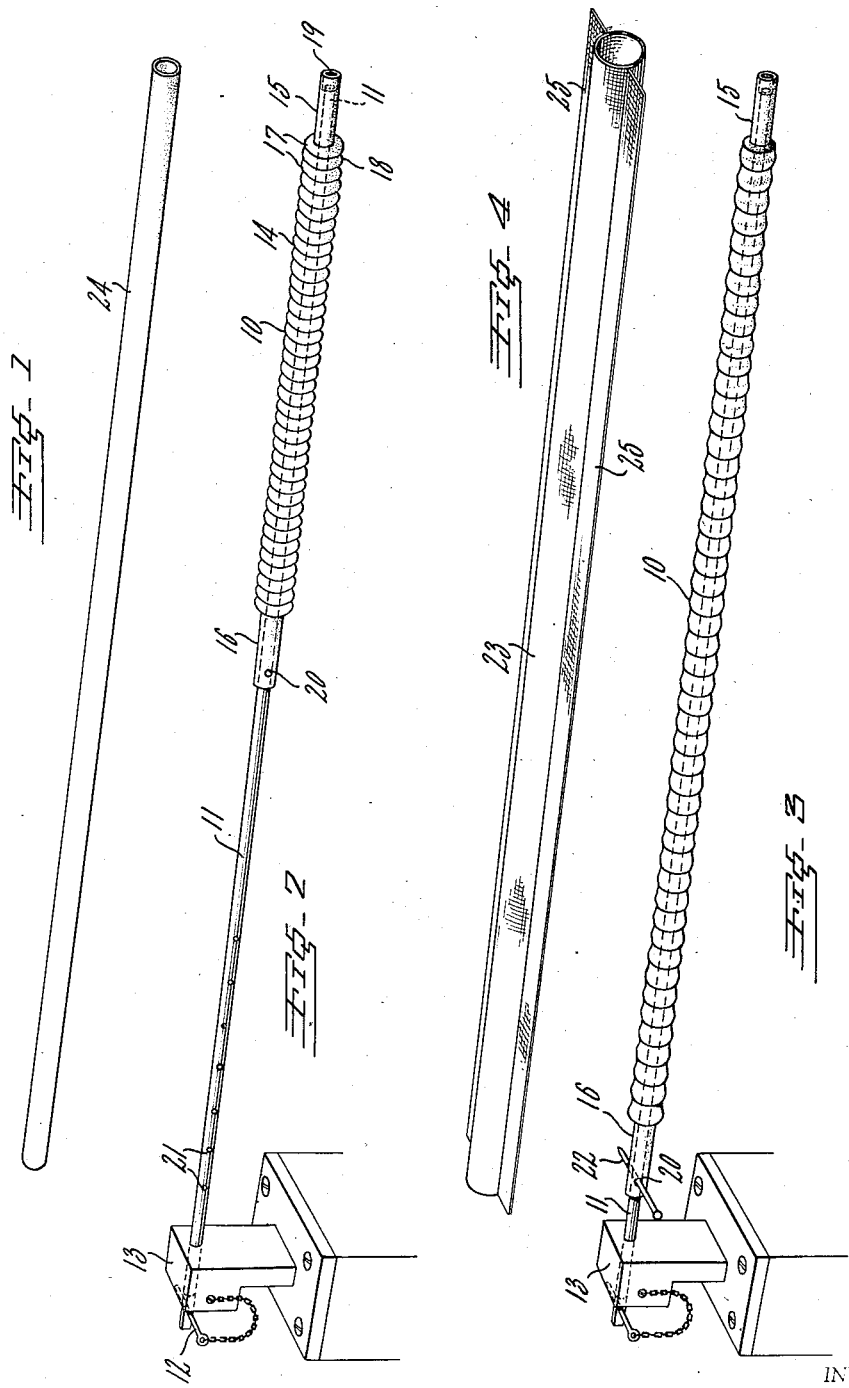
INVENTOR.
WATSON G. HARDING
BY
ATTORNEY

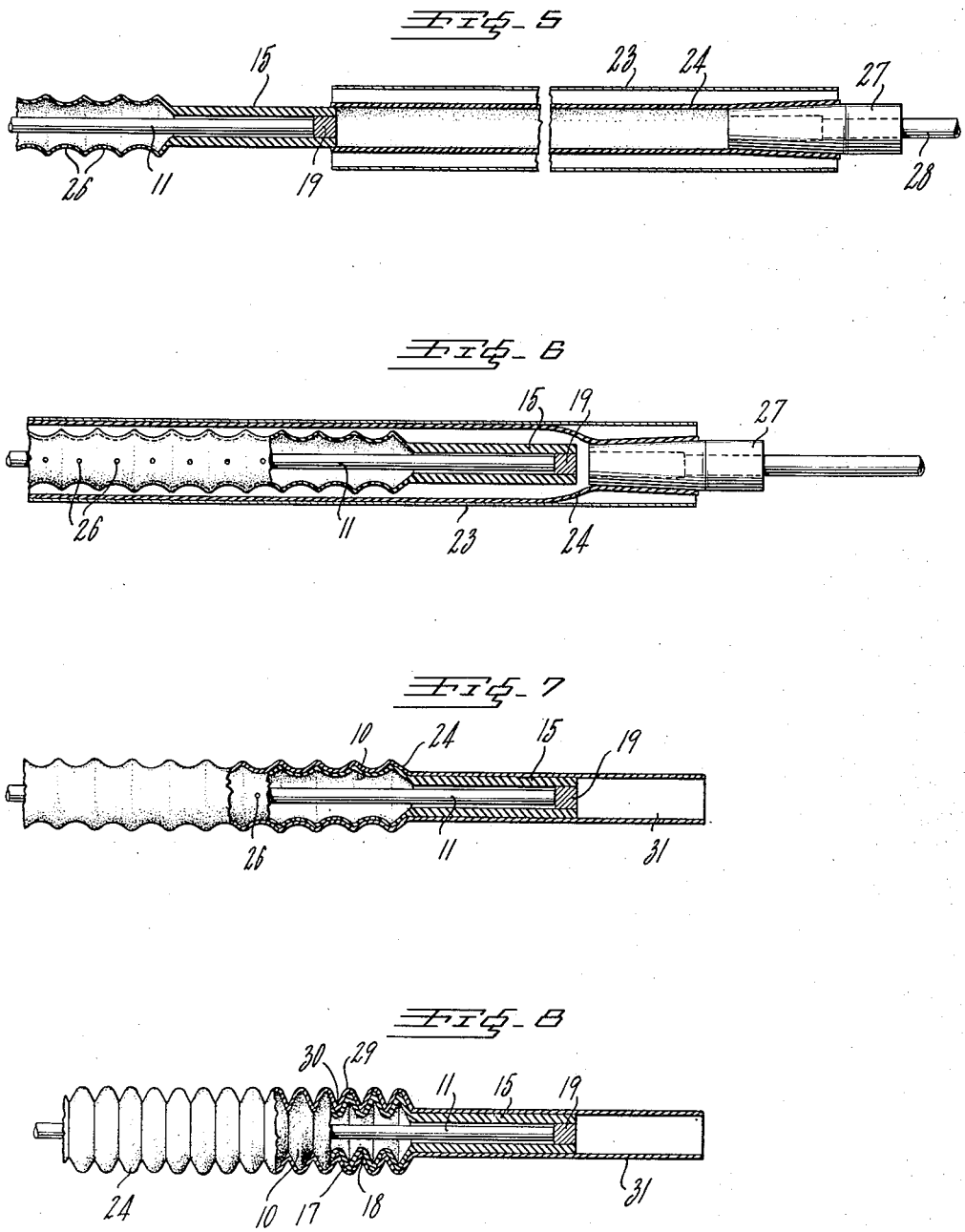

Patented Feb. 10, 1942

2,272,704

UNITED STATES PATENT OFFICE 2,272,704

METHOD AND APPARATUS FOR MAKING CORRUGATED TUBES

Watson G. Harding, Fair Lawn, N. J., assignor to United States Rubber Company, New York, N. Y., a corporation of New Jersey Application May 29, 1940, Serial No. 337,807

14 Claims. (Cl. 18—19)

This invention relates to a method and apparatus for making circumferentially corrugated tubes.

Heretofore, circumferentially corrugated rubber tubes have been made by the full molded and the partly molded and blown processes. In the full molded process, relatively expensive vulcanizing molds, including cores, are required, and after the tube has been molded and vulcanized, it must be pulled off the core. Then the overflow flash of rubber on the tube which has been forced between the mold halves and extends outwardly from the tube across the corrugations, must be trimmed off.

The partly molded and blown process has been used in the manufacture of corrugated rubber tubes to avoid the disadvantages of the full molded process, such as the expense of mold cores, removing the tubes from the cores, and to some extent the trimming of the overflow flash from the molded tube. In the partly molded and blown process, the circumferentially corrugated tube is made from an extruded uncured, or semi-cured rubber tube. The tube is shaped and vulcanized in a split mold without the use of a core, excepting the short end cores which shape the smooth end sections of the tube. The cores are inserted within the end sections and both are held in a fixed position within semi-cylindrical bores in the ends of the mold, while the corrugations are formed by the admission of compressed air through one of the end cores to the interior of the uncured or semi-cured rubber tube. The intermediate portion of the smooth rubber tube is expanded by the pressure against the inner walls of the mold which are provided with spaced circumferential ridges for forming the corrugations in the finished tube. As the rubber tube is expanded within the mold it first strikes the ridges on the mold walls which form the valleys in the tube. The walls of the tube are stretched from the ridges into the spaces therebetween which form the crests of the corrugations on the tube. The initial length of the uncured rubber tube when placed in the mold and the inside length of the mold are equal to the finished length of the corrugated tube, and as the ends of the uncured tube are held in a fixed position, all of the rubber required to fill the spaces between the mold ridges is supplied by the radial flow or stretch of the rubber. The maximum flow or stretch takes place at the top of the ridges on the mold. The rubber thins out at this point and thereby produces thinner walls in the valleys of the tube than at the crests of the corrugations. Such lack of uniformity in the thickness of the walls of the finished tube is objectionable. Such finished tubes are particularly objectionable for use in gas masks, because they do not possess the necessary strength, or wearing qualities, or resistance to puncture, due to the thin rubber in the valleys of the tubes.

The foregoing disadvantages of the prior art are avoided in the present method and apparatus embodying the present invention by shaping an uncured, that is a raw or partially cured rubber tube in a plastic condition, or other moldable tube, from which the finished circumferentially corrugated tube is made, on a circumferentially corrugated mandrel having an external shape which conforms substantially to the internal shape of the finished corrugated tube, and which may be substantially elongated to the developed axial length of the surface of the finished tube and collapsed to the normal length of such tube. The mandrel is preferably made of an elastic rubber composition, but may be made of other flexible materials such as rubberized fabrics, or copper or the like. In the event the mandrel is made of relatively inelastic materials the top and bottom of the corrugations may be slitted longitudinally to provide for radial expansion and contraction when the mandrel is elongated and collapsed, and a tight elastic jacket fitted over the mandrel is used to cover the slits.

Corrugated tubes having circular or spiral corrugations may be made, and mandrels of like shapes are used to make such shapes. In the practice of this invention the moldable tube is slipped over the mandrel while the mandrel is in an elongated condition and so that the interior surface of the tube fits the outside surface of the mandrel closely. The close fit may be obtained by the radial contraction of the tube after the tube is in position. The corrugated portion of the mandrel is elongated to substantially the developed axial length of the tube and the initial length of the moldable tube is at least as long as the elongated corrugated portion of the mandrel plus the length of the smooth portions of the finished tube that may be provided at each end.

The mandrel is then collapsed longitudinally carrying with it the tube and causing it to contract longitudinally and assume the collapsed corrugated shape of the mandrel. Since the tube is contracted or circumferentially folded throughout its length, its walls follow the contours of the valleys, or spaces between the ridges of the mandrel without causing the walls of the tube to be stretched or thinned out materially in any area. In fact in the case of the manufacture of a corrugated tube formed from an uncured or semi-cured rubber composition, there is a slight but inconsequential increase in the thickness of the walls of the finished tube in the valleys, due to the longitudinal contraction of the tube when the mandrel is collapsed. This slight increase in thickness in the valleys of the corrugated tube can be used to advantage in the event it is desired to finish the surface of the tube in a mold, or to apply a stockinette covering thereto, as hereinafter explained.

The present process has advantages over the prior processes in that a tube of the desired uniform thickness may be produced without the use of a mold for forming the exterior surfaces of the tube, and a reduction in the cost of equipment, and an increase in the speed of production is effected.

The foregoing, and other objects and advantages, of this invention will be more clearly understood from the following description and the accompanying drawings, in which the invention is described and illustrated more in detail.

In the drawings:

Fig. 1 is an isometric view of a smooth moldable tube from which the circumferentially corrugated tube is made in accordance with the apparatus and method embodying the present invention;

Fig. 2 is an isometric view of the apparatus, showing the mandrel in its collapsed condition, and upon which the tube is shaped;

Fig. 3 is an isometric view of the apparatus shown in Fig. 2, but illustrating the shaping mandrel in an elongated condition;

Fig. 4 is an isometric view of a retaining tube within which the moldable tube is inserted before inclosing the elongated mandrel shown in Fig. 3 therewith;

Fig. 5 is a broken cross-sectional view of the overhanging end of the apparatus, showing the moldable tube inserted within the retaining tube and in position ready to be pulled over the mandrel;

Fig. 6 is a cross-sectional view of the overhanging end of the mandrel showing the rubber tube and the retaining tube surrounding same and both in an inflated condition;

Fig. 7 is a cross-sectional view of the end of the mandrel as shown in Fig. 6, but the moldable tube has been deflated and the retaining tube has been removed; and Fig. 8 is a partially full and cross-sectional view of the end of the mandrel, with the moldable tube thereon, and both in the collapsed condition.

The apparatus with which the method may be carried out comprises a hollow mandrel 10 which is supported on a rod 11 extending thereinto. The rod 11 is secured by a pin 12 in a square socket formed in a fixed support 13. The mandrel 10 is preferably made of an elastic rubber composition and is provided with an intermediate corrugated portion 14, and smooth end portions 15 and 16 of a smaller diameter than the corrugated portion 14. The corrugated portion is provided with a plurality of corrugations having ridges 17 and valleys 18, as more particularly shown in Fig. 8. The bore in the smooth end 15 of the mandrel is closed by a plug 19, which when in place abuts against the end of the rod 11, as shown in detail in Figs. 5 to 8. The other smooth end 16 of the mandrel 14 is open and it is provided with a through aperture 20. Holes 21 are formed in the rod 11 and the mandrel 10 is adapted to be held in its elongated condition as shown in Fig. 3, by extending a pin 22 through the aperture 20 in the mandrel and one of the holes 21 in the rod 11. The retaining tube 23 is used in the operation of placing the moldable tube 24 (Fig. 1) over the elongated mandrel 10. The retaining tube 23 is preferably made of canvas and is provided with lateral flanges 25, which are formed by seaming together the edges of two strips of canvas. Holes 26 are formed in the valleys of the corrugations in mandrel 10 to permit any air between the tube 24 and the mandrel to escape when the tube is placed thereon.

In carrying out the process the mandrel 10 is stretched from its collapsed position in Fig. 2 to its elongated position in Fig. 3. If the mandrel is made of an elastic composition it contracts radially when stretched axially. The moldable tube 24, which may be made of rubber, or other moldable composition, is then placed in the retaining tube 23, as shown in Fig. 5. Where the tube 24 is tacky, as in the case of an uncured rubber tube, it is dusted inside and outside with talc before being placed in the retaining tube to prevent it from sticking to either the mandrel or the retaining tube 23. For convenience of illustration the tube 23 is shown in Fig. 4 as it would appear when inflated, but when the tube 24 is placed in the retaining tube 23, both are deflated and have a flat shape.

An air nozzle 27, adapted to be supplied with air under pressure through the hose 28, is inserted in one end of the moldable tube 24 and the other end of the tube is placed on the overhanging end 15 of the elongated mandrel 10. Air is admitted to the tube 24 by any convenient means, such as a valve adjacent to the nozzle 27, (not shown). The pressure of the air expands the tube 24 against the retaining tube 23, and as it does so, some of the air escapes from the opposite end of the tube 24 between it and the mandrel 10. One operator controls the flow of air and grasps the end of the retaining tube 23 over the nozzle 27 and holds the tube 24 against it to prevent the air from escaping therearound. Another operator supports the other ends of the retaining tube 23 and tube 24, and pulls the tubes over the mandrel 10 on the air cushion formed between the tube 24 and the mandrel 10 while both operators move along with the tubes. After the tube 24 has been placed over the mandrel 10 each end covers at least a portion of the smooth ends 15 and 16 of the mandrel, as shown in reference to the end 15 in Fig. 6. The air is then cut off from the nozzle 27, and the moldable tube 24 contracts radially around the mandrel 10 and in close fitting relation thereto, as shown in Fig. 7.

The air nozzle 27 is then removed from the end of the tube 24 and the retaining tube 23 is stripped off. The pin 22 is then removed from the aperture 20 in the end of the mandrel 10, and the mandrel is collapsed longitudinally along the rod 11, from the position shown in Fig. 3 to that shown in Fig. 2. In its elongated position, the length of the mandrel 10 is substantially equal to the developed length of the finished tube 24, and in its collapsed position, the length of the mandrel is substantially the same as the length of the finished collapsed corrugated tube. As the mandrel 10 collapses, it carries with it the moldable tube 24 and causes it to be collapsed longitudinally and conform to the contour of the mandrel 10, as shown in Fig. 8.

When the moldable tube 24 is fitted over the mandrel 10 and collapsed, its walls are thinned out slightly at the crests 29, but not to the extent that occurs in the valleys in the prior partly molded and blown process and the variation in tube thickness remains within the tolerances allowable in gas mask tubes. The tendency of the moldable tube 24 to be thinned out at the crests 29 is offset to some extent, by the longitudinal crowding together of the tube 24 when the mandrel 10 is collapsed. In fact the crowding together of the moldable tube 24 causes the walls to become slightly thicker in the valleys 30 of the corrugation in the tube 24. This increased thickness of the walls of the tube in the valleys 30 may be used to advantage in the event the tube is subsequently subjected to the partly molded and blown process to improve the rubber finish, or to provide a stockinette cover, such as is used in gas mask tubes, as will be hereinafter explained.

After the moldable tube 24 has been thus shaped, it is treated so as to cause it to retain its shape after it has been removed from the mandrel. Such treatment is not essential at this stage if the stockinette covering has been applied as will be explained. In the event the moldable tube 24 is made of an uncured vulcanizable rubber composition, it may be vulcanized in a vulcanizing chamber in the usual manner so as to cause it to retain its shape. When the mandrel 10 with the moldable tube 24 thereon is placed in the vulcanizing chamber, it is desirable that it be supported by a rod such as the rod 11, in order to keep the tube straight while it is being vulcanized. If the rod 11 is used it may be removed from its socket in the support 13 by removing the pin 12 and pulling on the rod. If desired, however, the mandrel 10 with the tube 24 thereon may be removed from the rod 11 and placed upon a shorter rod before placing the mandrel in the vulcanizing chamber, in order to economize on space in the chamber.

After the tube 24 has been vulcanized, or otherwise treated so as to cause it to retain its shape, the supporting rod 11 is replaced in its socket in the support 13, if previously removed therefrom, and the mandrel 10 with the vulcanized tube 24 thereon is again elongated from the position shown in Fig. 2 to that shown in Fig. 3, and is held in such position by the pin 22. A retaining tube slightly larger than the retaining tube 23 is then placed over the elongated mandrel 10 and tube 24, and the air nozzle 27, or preferably one having a bore slightly larger than the diameter of the smooth end 15 of the mandrel 10, is inserted within the overhanging end of the vulcanized tube 24. Air is then admitted from the nozzle 27 to the inside of the vulcanized corrugated tube 24. The tube 24 is blown outwardly somewhat in the condition shown in Fig. 6, excepting the corrugated portion of the tube will have a corrugated contour. The corrugated tube 24 may then be pulled off the mandrel 10 in the direction in which it was placed thereon by grasping the end of the retaining tube 23.

The compressed air is then cut off, the nozzle 27 is removed from the end of the finished tube 24, and the retaining tube is stripped off. The excess rubber 31 at the smooth ends of the vulcanized tube 24 is then removed, and the tube is complete, unless the corrugated tube 24 has been only semi-cured and it is desired to further cure the tube in accordance with the partly molded and blown process, for the purpose of improving the finish on the rubber surface, or for the purpose of improving the bond between a stockinette covering and the outer rubber surface which may be applied thereto as will be explained. Where the semi-cured corrugated tube 24 is given such additional cure, the greater wall thickness in the valleys of the corrugations, when pressed against the ridges in the mold, may be thinned out and made more nearly equal to the wall thickness of the tube elsewhere. Consequently the heavier wall thickness in the valleys may be an advantage where the tube is given this subsequent cure.

In the manufacture of a fabric covered corrugated rubber tube by the use of the previously described process, the fabric cover, such as a stockinette tube, is placed over the moldable uncured or semi-cured rubber tube before it is shaped on the mandrel 10. The rubber tube 24 is preferably placed in the stockinette tube before being placed on the mandrel 10. In such case, the outer surface of the rubber tube is not dusted with a permanent adhesive preventing material, such as talc. The tube 24 is coated with a rubber adhesive, preferably rubber cement, and then dusted with zinc stearate before the tube 24 is inserted in the stockinette tube, which will serve as a retaining tube, and it may replace the retaining tube 23. The other operations in the process will be carried out as before described excepting for the use of the removable retaining tube. The zinc stearate is used to render the rubber cement temporarily non-tacky so that the stockinette can be placed over the rubber tube. When zinc stearate is heated it melts and is absorbed by the rubber which becomes tacky again. Due to the action of the zinc stearate the stockinette cover will be permanently bonded to the corrugated rubber tube 24 under the heat in the vulcanizing chamber.

The stockinette tube may also be applied and bonded to a clean raw rubber tube without applying the coating of rubber adhesive thereto. In this case the raw rubber tube is dusted on the inside with talc and its outer surface is free from any permanent anti-adhesive material such as talc, but such outer surface is dusted with the temporarily anti-adhesive zinc stearate. The tube is placed within the stockinette covering tube and is then placed on the mandrel as above described, but the step of vulcanizing in the vulcanizing chamber is omitted. The raw stockinette tube is then removed from the mandrel by first elongating same and then stripping off with the use of the air nozzle, with or without employing the retaining tube 23. Where the raw rubber tube is shaped with the stockinette tube thereon, the stockinette supports the rubber sufficiently to prevent the corrugations from being ironed out permanently when the tube is removed. The covered raw rubber tube is then vulcanized in accordance with the partly molded and blown process. When the tube is placed in the mold it is collapsed longitudinally and it substantially reassumes its corrugated shape and fits into the corrugation of the mold so that when the tube is blown in the mold, the valleys of the tube are not stretched over the ridges in the mold to such an extent as to cause the walls of the tube to become thinner at this point than at other points, but is pressed against the mold ridges sufficiently to cause the walls as shaped on the mandrel to become more nearly equal to the original thickness of the tube. As the raw rubber is vulcanized under heat with the stockinette covering thereon, while it is forced tightly into the mold cavity by the internal air pressure, a secure bond is formed between the rubber and the stockinette. It is also contemplated that a raw rubber tube having stockinette cemented thereto with a rubber adhesive may be similarly vulcanized in a mold.

It is intended that the term "rubber" used herein shall include natural and synthetic rubber and compositions of such rubber. It is further intended that a solid elastic corrugated mandrel may be used for shaping the corrugated tube instead of the hollow mandrel shown in the drawings. The solid mandrel can be used in the same manner as the hollow mandrel, except in reference to the method and apparatus for elongating the solid mandrel for placing the moldable tube thereon and for removing the shaped tube therefrom. In the use of the solid mandrel it is stretched between a support and the projecting end of a rod having its other end fixed to a second support. Before stretching the mandrel between the end of the rod and the support the annulus of a ring shaped air nozzle having an axially extending discharge orifice and a radial outwardly extending inlet is placed over the rod followed by the moldable tube in its retaining tube. The mandrel is then stretched, and the moldable tube is placed on the mandrel by placing the end of the tube over the end of the mandrel adjacent thereto. Then by inserting the nozzle orifice in the other end of the tube it can be ridden over the mandrel upon the cushion of air and removed therefrom as previously described.

It is contemplated that the details of the several forms of the invention described herein may be changed without departing from the spirit of the invention and it is desired to claim the invention as broadly as permitted by the prior art and to the extent covered by the claims appended hereto.

Having thus described my invention what I claim and desire to protect by Letters Patent is:

1. The method of making circumferentially corrugated tubes comprising the steps of elongating a circumferentially corrugated mandrel having an external shape conforming substantially to the internal shape of the corrugated tube to be made, inclosing the elongated mandrel within a moldable tube, collapsing the mandrel longitudinally and the tube thereon, treating the tube so as to render it self-supporting as to shape, and removing the tube from the mandrel.

2. The method of making circumferentially corrugated rubber tubes comprising the steps of elongating a circumferentially corrugated mandrel having an external shape conforming to the internal shape of the rubber tube to be made, inclosing the elongated mandrel within a moldable rubber tube in close fitting relation thereto, collapsing the mandrel longitudinally and the rubber tube thereon, treating the rubber tube so as to render it self-supporting as to shape, and removing the tube from the mandrel.

3. The method of making circumferentially corrugated rubber tubes comprising the steps of elongating a circumferentially corrugated mandrel having an external shape conforming to the internal shape of the finished rubber tube to be made, placing an uncured rubber tube over the elongated mandrel so that it fits snugly therearound, collapsing the mandrel longitudinally and the rubber tube thereon, vulcanizing the rubber tube, elongating the mandrel to substantially its first extended position and removing the tube from the mandrel.

4. The method of making circumferentially corrugated rubber tubes, comprising the steps of longitudinally stretching an elastic mandrel normally having an external circumferentially corrugated shape conforming substantially to the internal shape of the finished rubber tube to be made and simultaneously contracting the mandrel transversely, placing an uncured rubber tube over the stretched mandrel so that it fits snugly therearound, releasing the tension on the mandrel so as to permit it to contract longitudinally and expand transversely, vulcanizing the tube, and removing the tube from the mandrel.

5. The method of making circumferentially corrugated rubber tubes comprising the steps of elongating a circumferentially corrugated mandrel having an outer surface adapted to shape the internal surface of the tube to be made, inserting a moldable rubber tube within a retaining jacket, inflating said rubber tube until its walls are forced against the walls of said jacket, inclosing said mandrel within said inflated rubber tube, deflating said rubber tube, removing said jacket, releasing the tension on said mandrel to permit it to collapse longitudinally, vulcanizing said rubber tube, inclosing said rubber tube and mandrel in a retaining jacket, inflating said rubber tube, and dismounting said tube from said mandrel.

6. The method of making circumferentially corrugated rubber tubes comprising the steps of longitudinally stretching an elastic mandrel normally having an external circumferentially corrugated shape conforming substantially to the internal shape of the finished rubber tube to be made and simultaneously contracting the mandrel transversely, inserting into a retaining jacket an uncured rubber tube having a diameter at least as small as the diameter of the mandrel across the valleys of the corrugations in the unstretched mandrel, inflating the rubber tube and riding it over the mandrel upon the cushion of the inflating medium, deflating the rubber tube, removing the retaining jacket, releasing the tension on the mandrel so as to permit it to contract longitudinally and expand transversely so as to cause the rubber tube to assume the corrugated shape of the mandrel, vulcanizing the tube, stretching the mandrel to substantially its first extended position, and removing the tube by riding it off the mandrel with an inflating medium.

7. The method of making circumferentially corrugated rubber tubes comprising the steps of elongating a mandrel having a circumferentially corrugated outer surface which conforms substantially to the internal shape of the finished rubber tube to be made when both are in their non-elongated conditions, placing an uncured length of rubber tube inside a tubular jacket, placing one end of the uncured rubber tube over one end of the elongated mandrel, inserting a nozzle into the other end of the tube, inflating the tube against the jacket and riding the tube and jacket over the mandrel on a cushion formed by the escape of the inflating medium between the tube and the mandrel, deflating the rubber tube until it fits closely around the mandrel, removing the jacket, collapsing the mandrel longitudinally and the rubber tube thereon, vulcanizing the uncured rubber tube, longitudinally elongating the mandrel, placing the retaining jacket over the vulcanized tube, inflating the tube and riding it off the mandrel with the inflating medium.

8. The method of making circumferentially corrugated rubber tubes, comprising the steps of elongating a circumferentially corrugated mandrel having an external shape conforming substantially to the internal shape of the corrugated rubber tube to be made, inclosing the elongated mandrel within a moldable vulcanizable rubber tube having a tacky outer surface and an inner surface in close fitting relation to the mandrel, inclosing the rubber tube within a radially stretchable fabric in close fitting relation thereto, collapsing the mandrel longitudinally and the rubber tube and fabric thereon, vulcanizing the rubber tube, and removing the tube and the fabric cover from the mandrel.

9. The method of making circumferentially corrugated rubber tubes, comprising the steps of elongating a circumferentially corrugated mandrel having an external shape conforming substantially to the internal shape of the corrugated rubber tube to be made, inclosing the elongated mandrel within a moldable vulcanizable rubber tube having a tacky outer surface and an inner surface in close fitting relation to the mandrel, inclosing the rubber tube within a radially stretchable fabric in close fitting relation thereto, collapsing the mandrel longitudinally and the rubber tube and fabric thereon, partially vulcanizing the rubber tube on the mandrel, removing the partially vulcanized tube and fabric cover from the mandrel, placing the covered tube in a mold, inflating the tube and further vulcanizing the same.

10. The method of making circumferentially corrugated tubes comprising the steps of elongating a circumferentially corrugated mandrel having an external shape conforming substantially to the internal shape of the corrugated tube to be made, applying a coating of rubber adhesive to an uncured rubber tube, inserting the tube within a knitted tubular jacket, placing the tube and jacket on the elongated mandrel, collapsing the mandrel longitudinally and the tube and jacket thereon, vulcanizing the tube so as to render it self-supporting and to bond the jacket thereto, and removing the tube and jacket from the mandrel.

11. The method of making circumferentially corrugated tubes comprising the steps of elongating a circumferentially corrugated mandrel having an external shape conforming substantially to the internal shape of the corrugated tube to be made, inserting an uncured rubber tube within a knitted fabric jacket, placing the tube with the jacket thereon over the elongated mandrel, collapsing the mandrel longitudinally and the tube and jacket thereon so as to corrugate same, elongating the mandrel, removing the tube and jacket therefrom, blowing the tube within a mold and vulcanizing same with the jacket thereon.

12. An apparatus for making corrugated tubes, said apparatus comprising a longitudinally elongatable and contractible circumferentially corrugated hollow mandrel having an open end and an internal abutment at the other end, a rod for elongating said mandrel, said rod having an end adapted to extend through said open end and into said mandrel and abut against said abutment, the other end of said rod being adapted to extend outside of said mandrel when the opposite end engages said abutment, a holder for securing the outwardly extending end of said rod, and means cooperating with the open end of said mandrel for holding said mandrel in an elongated condition.

13. An apparatus for making corrugated tubes, said apparatus comprising a longitudinally elongatable and contractible circumferentially corrugated hollow mandrel having an open end and an internal abutment at the other end thereof, said mandrel having apertures in the valleys between the ridges of said corrugations, a rod for elongating said mandrel, said rod having an end adapted to extend through said open end and into said mandrel and abut against said abutment, the other end of said rod being adapted to extend outside of said mandrel when the opposite end engages said abutment, a holder for securing the outwardly extending end of said rod, and means cooperating with the open end of said mandrel for holding said mandrel in an elongated condition.

14. An apparatus for making corrugated tubes comprising a hollow elastic circumferentially corrugated rubber mandrel closed at one end and open at the other, a stretching rod for said mandrel having an end adapted to extend into said mandrel and abut against said closed end, a holder for securing the other end of said rod, and means cooperating with the open end of said mandrel for holding said mandrel in an elongated condition.

WATSON G. HARDING.